United States Patent
Aizawa

(10) Patent No.: US 9,305,234 B2
(45) Date of Patent: Apr. 5, 2016

(54) KEY WORD DETECTION DEVICE, CONTROL METHOD, AND DISPLAY APPARATUS

(71) Applicant: OMRON Corporation, Kyoto-Shi (JP)

(72) Inventor: Tomoyoshi Aizawa, Kyoto (JP)

(73) Assignee: OMRON CORPORATION, Kyoto-shi (JP)

( * ) Notice: Subject to any disclaimer, the term of this patent is extended or adjusted under 35 U.S.C. 154(b) by 0 days.

(21) Appl. No.: 14/380,230

(22) PCT Filed: Dec. 26, 2012

(86) PCT No.: PCT/JP2012/083644
§ 371 (c)(1),
(2) Date: Nov. 24, 2014

(87) PCT Pub. No.: WO2013/136628
PCT Pub. Date: Sep. 19, 2013

(65) Prior Publication Data
US 2015/0317530 A1     Nov. 5, 2015

(30) Foreign Application Priority Data
Mar. 14, 2012  (JP) ................. 2012-057999

(51) Int. Cl.
 *G06K 9/32* (2006.01)
 *G06K 9/46* (2006.01)
 *G06F 17/30* (2006.01)

(52) U.S. Cl.
 CPC ........ *G06K 9/3266* (2013.01); *G06F 17/30967* (2013.01); *G06K 9/4604* (2013.01); *G06K 2209/01* (2013.01); *G06K 2209/011* (2013.01)

(58) Field of Classification Search
 None
 See application file for complete search history.

(56) References Cited

U.S. PATENT DOCUMENTS

2008/0279453 A1* 11/2008 Candelore .............. G03B 21/26
                                                                  382/176
2009/0043769 A1   2/2009 Komai et al.
(Continued)

FOREIGN PATENT DOCUMENTS

JP    2009-044658 A    2/2009
JP    2009-105587 A    5/2009
(Continued)

OTHER PUBLICATIONS

[No Author Listed] Digital Image Processing [Dijitaru Gazo Shori], 2nd Edition, Computer Graphic Arts Society, 2009, pp. 311-313, Japanese language document.
(Continued)

*Primary Examiner* — Wesley Tucker
(74) *Attorney, Agent, or Firm* — Nutter McClennen & Fish LLP; John J. Penny, Jr.

(57) ABSTRACT

A key word detection device and a method for detecting a search key word from a target image in order to perform a search with a search engine on the internet, the key word detection device comprising: a processor configured to operate as a feature point detector configured to detect a feature point of a specific character string from the target image, the specific character string prompting a user to perform the search; a key word recognition unit configured to recognize a character string existing in surroundings of the feature point detected by the feature point detector as the search key word in the target image; and a storage for storing character information and data of the target image used by the processor.

11 Claims, 9 Drawing Sheets

(56) References Cited

U.S. PATENT DOCUMENTS

| | | | |
|---|---|---|---|
| 2011/0128288 A1* | 6/2011 | Petrou | G06F 17/30047 345/428 |
| 2014/0023267 A1 | 1/2014 | Aizawa | |

FOREIGN PATENT DOCUMENTS

| JP | 2009-188886 A | 8/2009 |
|---|---|---|
| JP | 2009-245464 A | 10/2009 |
| JP | 2010-039647 A | 2/2010 |
| JP | 2010-152800 A | 7/2010 |
| JP | 4893861 B1 | 3/2012 |

OTHER PUBLICATIONS

International Search Report for Application No. PCT/JP2012/083644, mailed Feb. 12, 2013 (4 pages).

Korean Office Action for Application No. 10-2014-7023172, issued Nov. 18, 2015 (4 pages).

* cited by examiner

KEY WORD DETECTION DEVICE, CONTROL METHOD, AND DISPLAY APPARATUS

CROSS-REFERENCE TO RELATED APPLICATION

This application claims the benefit of priority from Japanese Patent Application No. 2012-057999, filed on Mar. 14, 2012, the entire contents of which is incorporated herein by reference for all purposes.

FIELD

The present invention relates to a key word detection device that detects a search key word from a target image in order to perform a search with a search engine on the internet, and a control method and a computer-readable recording medium relating to the same, and a display apparatus.

BACKGROUND

Nowadays, a search key word used to perform a search with a search engine on the internet is transmitted in a television (hereinafter referred to as "TV") broadcasting image such as a CM (Commercial Message). The search key word is displayed on a TV broadcast receiver as a part of the TV broadcasting image, which prompts a user to search the search key word with the search engine.

However, because the search key word is displayed for a short time in many cases, a user may miss the search key word. When a situation is not the case that the user immediately performs the search on the internet, sometimes the user forgets the displayed search key word before the search.

In order to avoid the problem, it is conceivable that a character string of the search key word is recognized from the TV broadcasting image to extract the search key word.

For example in an internet television device disclosed in Patent Document 1 (Japanese Unexamined Patent Publication No. 2010-039647), the character string is detected from a video picture of TV broadcasting by character recognition, a word is detected from the detected character string, and a key word used to search information on a network is decided from the detected word according to a predetermined condition.

Patent Document 2 (Japanese Unexamined Patent Publication No. 2009-188886) discloses an information processing device that performs the search on the internet using a key word detected from various search guiding screen presented by the TV broadcasting. Specifically, a change amount between a latest input image and a preceding input image within a predetermined time is calculated, and character recognition processing is performed in a region where the change amount is less than or equal to a threshold. The image including the character string is necessary to be continuously displayed for a certain period of time so that the user can recognize the character string. Therefore, extremely small change amount of the character string is considered, so that the character string including the key word can be extracted by the character recognition processing.

SUMMARY

In accordance with one aspect of the present invention, there is provided a key word detection device for detecting a search key word from a target image in order to perform a search with a search engine on the internet, the key word detection device comprising: processor configured to operate as a feature point detector configured to detect a feature point of a specific character string from the target image, the specific character string prompting a user to perform the search; a key word recognition unit configured to recognize a character string existing in surroundings of the feature point detected by the feature point detector as the search key word in the target image; and a storage for storing character information and data of the target image used by the processor.

In accordance with another aspect of an embodiment of the present invention, there is provided a display apparatus comprising: the key word detection device for detecting the search key word from the target image in order to perform the search with the search engine on the internet; and a display device configured to display the search key word detected by the key word detection device and the target image.

In accordance with yet another aspect of an embodiment of the present invention, there is provided a method for controlling a key word detection device configured to detect a search key word from a target image, the search key word being used to perform a search with a search engine on the internet, the key word detection device comprising a processor configured to carry out steps of the method and a storage for storing character information and data of the target image used by the processor, the method comprising: a feature point detection step of detecting a feature point of a specific character string from the target image, the specific character string prompting a user to perform the search; and a key word recognition step of recognizing a character string existing in surroundings of the feature point detected in the feature point detection step as the search key word in the target image.

In accordance with another aspect of an embodiment of the present invention, there is provided a non-transitory computer-readable recording medium, having stored thereon computer-readable instructions for executing, by a computer, the method for controlling a key word detection device configured to detect a search key word from a target image.

DETAILED DESCRIPTION

Figure 1:
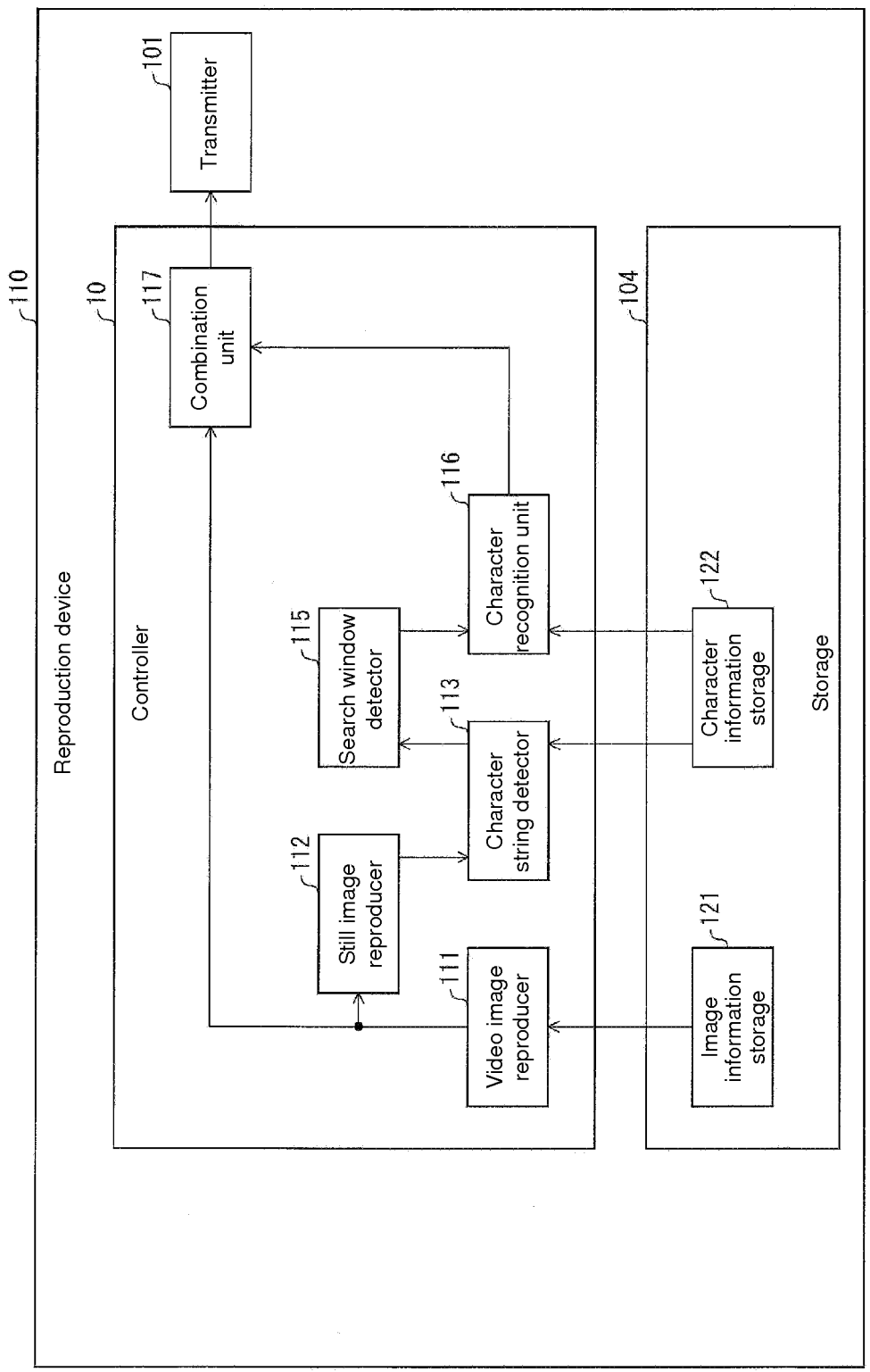
FIG. 1 is a block diagram illustrating a schematic configuration of a reproduction device according to a first embodiment of the invention.

In the internet television device of Patent Document 1 (Japanese Unexamined Patent Publication No. 2010-

039647), the key word is detected after the character recognition is performed to an entire video picture of the TV broadcasting. In this case, it is necessary to perform a first processing to match a feature point of the character against a feature point of the target image and a second processing to search the key word from the character string detected by the matching with respect to each of many characters. Particularly, in the case of a kanji-character cultural zone such as Japan and China, since the number of target characters for character recognition is three thousands or more, a processing burden increases and a processing time is lengthened.

On the other hand, in the information processing device of Patent Document 2 (Japanese Unexamined Patent Publication No. 2009-188886), an image region serving as the character recognition target is restricted to the region where the change amount between the latest input image and the preceding input image within a predetermined time is less than or equal to the threshold, so that the processing time can be shortened. However, it is necessary to deal with at least two frame images in order to calculate the change amount. Therefore, unfortunately a large amount of memory capacity is used to lengthen the processing time. For the same reason, the information processing device cannot be used for a still image.

Therefore, a technology focusing on the fact that a search window used to input the search key word is provided in a distinct form is proposed as a technology for rapidly extracting the search key word.

FIGS. 9(a) to 9(e) illustrate examples of the search window. As illustrated in FIGS. 9(a) to 9(e), in many cases the search window is provided on the left side of the character string, such as "検索", which prompts the user to perform the search, in a rectangular form or a form that is similar to the rectangular form with round right and left sides. Sometimes the character string such as "検索" is provided while surrounded by a rectangular frame or the like, or sometimes the character string is provided while not surrounded by the frame.

For example, Patent Document 3 (Japanese Unexamined Patent Publication No. 2009-044658) discloses a technology for extracting a place of a horizontal or vertical straight line from the image. Therefore, the region representing the search window of the search engine is specified, and the search key word can be extracted from the region.

In Patent Document 4 (Japanese Unexamined Patent Publication No. 2010-152800), a video picture having the shape of a character input region (search window) and having an array of characters to be input to the character input region is extracted from a video picture displayed on a screen. Therefore, only the search window region where the characters are arrayed in the character input region in a distinct form can correctly be extracted from the image.

However, sometimes many rectangles or polygons similar to the search window but not the search window are displayed in video images including a landscape, such as the TV broadcasting image. In Patent Documents 3 and 4, it is necessary to extract the character or the feature amount of the character with respect to each of the rectangles or polygons, which lengthens the processing time. Particularly, the long processing time is a serious problem when dealing with video image in which real-time property is required.

In view of the above problem, an object of an embodiment of the invention is to provide a key word detection device that can rapidly detect a search key word.

[First Embodiment]

A first embodiment of the invention will be described below with reference to FIGS. 1 to 4(b).

[Configuration of Reproduction Device]

FIG. 1 illustrates a schematic configuration of reproduction device (key word detection device) 110 of the first embodiment. Reproduction device 110 reproduces a stored video image data and transmits the reproduced video image data to an external device such as a display device. As illustrated in FIG. 1, reproduction device 110 includes a controller 10, a transmitter 101, and a storage 104.

The Controller 10 wholly controls operation of each configuration in the reproduction device 110. For example, the controller 10 is constructed with a computer including a CPU (Central Processing Unit) and a memory. Operation control of each configuration is performed by causing the computer to execute a control program. The Controller 10 is described in detail later.

The Storage 104 is one in which information is recorded, and the storage 104 is constructed with a storage device such as a hard disk, a flash memory, a ROM (Read Only Memory), and a RAM (Random Access Memory). The Storage 104 is described in detail later.

The Transmitter 101 converts data from the controller 10 into a form suitable for data transmission, and transmits the data to an external device. The data may be transmitted in either wired or wireless manner.

In the first embodiment, the reproduction device 110 detects a search key word from a still image (target image) present in a video image in order to perform a search with a search engine on the internet. The Reproduction device 110 detects a feature point of a specific character string prompting a user to perform the search in the still image, detects from surroundings of the detected feature point a search window used to input the search key word, and recognizes the character string in the detected search window as the search key word.

Therefore, compared with the case that the specific character string is extracted after the character recognition is performed to the whole still image, it is only necessary to perform matching against the feature points of some specific character strings, and it is not necessary to perform matching against the feature points of many characters. As a result, the feature point of the specific character string can be rapidly detected. Similarly, a shape of the search window is restricted to, for example, a rectangle, so that the search window can be rapidly detected. A region where the character string is recognized as the search key word is restricted to the search window, so that the character string can be rapidly recognized. As a result, the search key word can be rapidly detected than ever before.

The feature point of the specific character string is detected from the still image, so that processing can accurately be performed in real time even for a complicated background. Even if the background of the specific character string such as "検索" has a gradation, or even if a landscape is inserted in the background of the specific character string, the character string can be rapidly recognized, and therefore the detection accuracy of the search key word can be improved. Even if the specific character string such as "検索" is not surrounded by the rectangle, the detection can be properly performed. It is not necessary to deal with a plurality of frame images, and it is not necessary to ensure a memory capacity for the frame images.

The Controller 10 and the storage 104 will be described in detail below. As illustrated in FIG. 1, the controller 10 includes a video image reproducer 111, a still image reproducer 112, a character string detector 113 (feature point detector), a search window detector 115, a character recognition unit 116 (key word recognition unit), and a combination unit 117. The Storage 104 includes a image information storage 121 and a character information storage 122.

The video image data is stored in the image information storage 121. A character information DB (database) is stored in the character information storage 122. The character information DB is information on a character, and is information necessary to detect the specific character string and to recognize various characters. Specifically, the character information DB includes a character code, a feature amount of the specific character string, and feature amounts of various characters.

The Video image reproducer 111 reproduces the video image data stored in the image information storage 121. The Video image reproducer 111 transmits the reproduced video image data to the still image reproducer 112 and the combination unit 117. Alternatively, the still image data may be stored in the image information storage 121, and the video image reproducer 111 may reproduce the still image data. Because the reproduction is a well-known technology, the detailed description of the reproduction is neglected.

The Still image reproducer 112 generates the still image by decoding the video image data from the video image reproducer 111 at predetermined time intervals. The Still image reproducer 112 transmits the generated still image to the character string detector 113.

The Character string detector 113 detects the specific character string by detecting the feature point of each character present in the specific character string prompting the user to perform the search from the still image transmitted from the still image reproducer 112. The Character string detector 113 transmits positional information on which the detected specific character string is located in the still image to the search window detector 115 together with the still image. A portion in which brightness changes rapidly in the image can be cited as an example of the feature point.

Patent Document 5 (Japanese Patent No. 4893861) discloses an example of a method for detecting the specific character string. At least one cluster including a given number or more of pixel groups having similar colors is defined based on color information of each pixel constituting the still image. The still image is divided into a region of the pixel groups belonging to the defined cluster and a region of other pixel groups to generate a clipping image in which the region of the other pixel groups is removed from the still image. The feature point of each character present in the specific character string is detected from the generated clipping image, thereby detecting the specific character string.

"検索", "サーチ", "確認", "チェック", and the translated words thereof can be cited as an example of the specific character string prompting the user to perform the search. Hereinafter, "検索" is used as the specific character string prompting the user to perform the search, and the specific character string is written as a "検索" character string.

Using the still image and the positional information on the "検索" character string from the character string detector 113, the search window detector 115 detects the search window from the surroundings of the position where the "検索" character string is located in the still image. The Search window detector 115 transmits the information on the region where the detected search window is located in the still image to the character recognition unit 116 together with the still image. The processing of detecting the search window is described in detail later.

The Character recognition unit 116 recognizes one or a plurality of characters in the search window using the still image and the region information on the search window from the search window detector 115. The Character recognition unit 116 transmits the character string constructed with the recognized characters as the search key word to the combination unit 117.

Non-Patent Document 1 ("Dijitaru Gazo Shori (Digital image processing)", 2nd edition, Computer Graphic Arts Society, 2009, pp. 311-313) discloses an example of a method for recognizing the character, and there is also another method for recognizing the character. That is, circumscribed rectangle information on the character image in which the character should be recognized is acquired using a histogram for counting the number of black pixels. Then a feature vector of the character image is obtained by extracting an edge component or the like of the character image within the circumscribed rectangle. The character code of one or a plurality of characters having a high degree of similarity to the character image is acquired by comparing the feature vector of the character image to a feature vector in a character recognition dictionary previously stored in the character information storage 122. The character code becomes the character code of the character recognized from the character image.

The Combination unit 117 combines the search key word at a proper place of the video image using the video image data from the video image reproducer 111 and the search key word from the character recognition unit 116. The Combination unit 117 transmits the video image data in which the search key word is combined to an external device through the transmitter 101.

[Processing in Reproduction Device]

The processing in the reproduction device 110 having the above configuration will be described below with reference to FIG. 2. In the first embodiment, the reproduced image data is video image (streaming video image) data.

Figure 2:
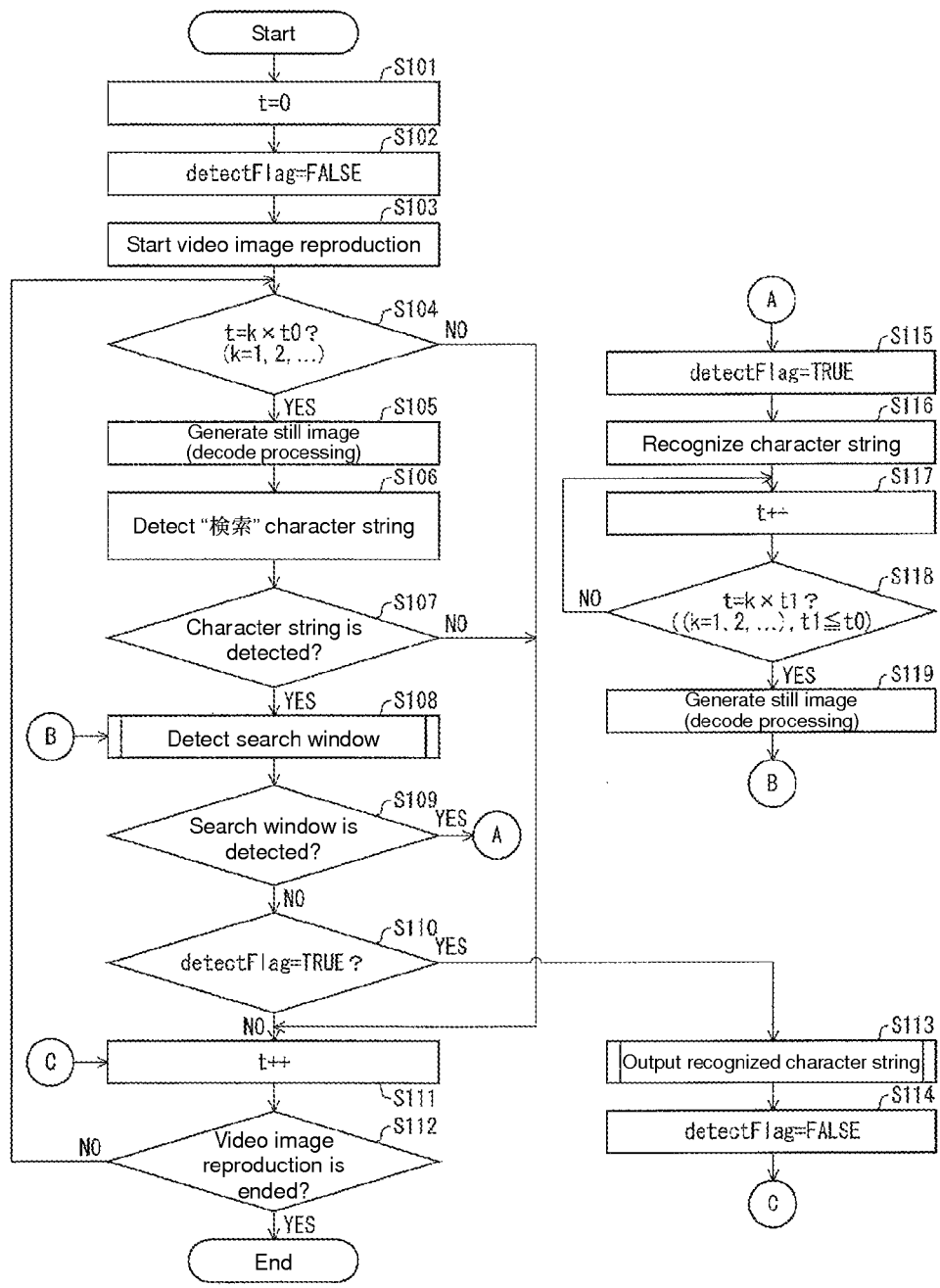
FIG. 2 is a flowchart illustrating a procedure of key word detection processing performed by a controller of the reproduction device.

FIG. 2 is a flowchart illustrating a procedure of the key word detection processing performed by the controller 10 of the reproduction device 110. As illustrated in FIG. 2, clock time t of a timer (not illustrated) is set to 0 to perform initialization in which a search window detection state flag detectFlag is not set (FALSE), in other words, the search window is not detected (S101 and S102). The Video image reproducer 111 starts the video image reproduction (S103). Therefore, the reproduced video image data is transmitted to the external device through the combination unit 117 and the transmitter 101.

Then the still image reproducer 112 determines whether clock time t satisfies a condition of t=k×t0 (S104). Where k is a natural number and t0 is a predetermined period. When the clock time t does not satisfy the condition (NO in S104), the procedure goes to Step S111.

On the other hand, when the clock time t satisfies the condition (YES in S104), the still image reproducer 112 generates the still image by decoding the video image data (frame image data) reproduced by the video image reproducer 111 (S105). The period during which the still image is produced can be adjusted by properly setting the predetermined period t0.

Then the character string detector 113 detects the character string prompting the user to perform the search processing, namely, the "検索" character string in the still image generated by the still image reproducer 112 (S106, feature point detection step). When the "検索" character string cannot be detected (NO in S107), the procedure goes to Step S111.

On the other hand, when the "検索" character string can be detected (YES in S107), the search window detector 115 detects the search window from the surroundings of the position where the "検索" character string detected by the character string detector 113 is located in the still image (S108). The processing of detecting the search window is described in detail later. When the search window can be detected (YES in S109), the procedure goes to Step S115. On the other hand, when the search window cannot be detected (NO in S109), the procedure goes to Step S110.

In Step S115, the search window detector 115 sets the search window detection state flag detectFlag (TRUE). This indicates the state in which the search window is detected. Then the character recognition unit 116 recognizes one or a plurality of characters in the search window detected by the search window detector 115, and recognizes the character string constructed with the recognized characters (S116, key word recognition step). As described above, the character recognition processing is performed by the well-known technology.

The Still image reproducer 112 waits until the clock time t passes to satisfy a condition of t=k×t1 (S117 and S118), where t1 is a predetermined period satisfying t1≤t0. For example, assuming that the clock time t at which the processing in Step S116 has ended is t0', and that the condition of t1≤t0'<2×t1 is satisfied, the still image reproducer 112 waits until the clock time t=2×t1.

When the condition in Step S118 is satisfied, the still image reproducer 112 generates the still image similarly to Step S105 (S119). Then, the procedure returns to Step S108, and the search window detector 115 detects the search window. That is, when the "検索" character string is once detected to detect the search window, the detection of the "検索" character string is omitted until the search window is not detected. Therefore, the search key word can be more rapidly detected. The Period t1 during which the still image reproducer 112 produces the still image can be shortened compared with the period t0 (t1<t0).

Because the feature point of the "検索" character string is detected by checking the whole still image, time necessary for the detection is lengthened with increasing size of the still image. Accordingly, the delay of the detection of the search key word due to the increased size of the still image can be constrained in the above configuration. Particularly the configuration is effectively used in the large-size still image such as a full HD size (1920 pixels×1080 pixels).

In Step S110, the character recognition unit 116 determines whether the search window detection state flag detectFlag is set (TRUE), in other words, whether the search window is detected from the previous still image. When the search window is detected from the previous still image, in other words, when the search window disappears in the present still image, the procedure goes to Step S113. On the other hand, when the search window is not detected from the previous still image, in other words, when the state in which the search window is not detected is continued, the procedure goes to Step S111.

In Step S113, the combination unit 117 combines the data of the character string (recognized character string) recognized by the character recognition unit 116 as the data of the search key word candidate with the video image data reproduced by the video image reproducer 111, and transmits the combined video image data to the external device through the transmitter 101 (S113).

In the case that the character recognition unit 116 cannot recognize the character string, the combination unit 117 may combine the data of an error message "character string cannot be recognized" with the video image data, or directly transmit the pre-combination video image data to the external device through the transmitter 101. In the case that the character recognition unit 116 can recognize the plurality of character strings, the pieces of data of the recognized character strings may be combined as the data of the search key word candidate with the video image data.

Then the combination unit 117 is set to the state in which the search window detection state flag detectFlag is turned off (FALSE) (S114), and the procedure goes to Step S111.

After unit time elapses in Step S111, the video image reproducer 111 determines whether the reproduction of the video image data has ended (S112). When the reproduction of the video image data has not ended, the procedure returns to Step S104 to repeat the above operation. On the other hand, when the reproduction of the video image data has ended, the processing is ended.

[Search Window Detection Processing]

The detailed search window detection processing (S108) in FIG. 2 will be described below with reference to FIGS. 3, 4(a), 4(b), and 9(a) to 9(e). As illustrated in FIGS. 9(a) to 9(e), generally a search window SB is located on a left side of a "検索" character string SC, a right end of an upper side of the search window SB is located on the upper left of the "検索" character string SC, and the right end of a lower side of the search window SB is located on the lower left of the "検索" character string SC.

In the first embodiment, the search window SB is detected as follows. At first, a line segment extending leftward from the region of the upper left of the "検索" character string SC is detected as an upper line (upper side) of the search window SB, and a line segment extending leftward from the region of the lower left of the "検索" character string SC is detected as a lower line (lower side) of the search window SB. Then, a line (line segment or curved line) connecting the detected right ends of the upper and lower lines is detected as a right line of the search window SB, and a line (line segment or curved line) connecting the detected left ends of the upper and lower lines is detected as a left line of the search window SB. Therefore, all the lines (upper line, lower line, right line, and left line) constituting the search window SB are detected.

Figure 3:
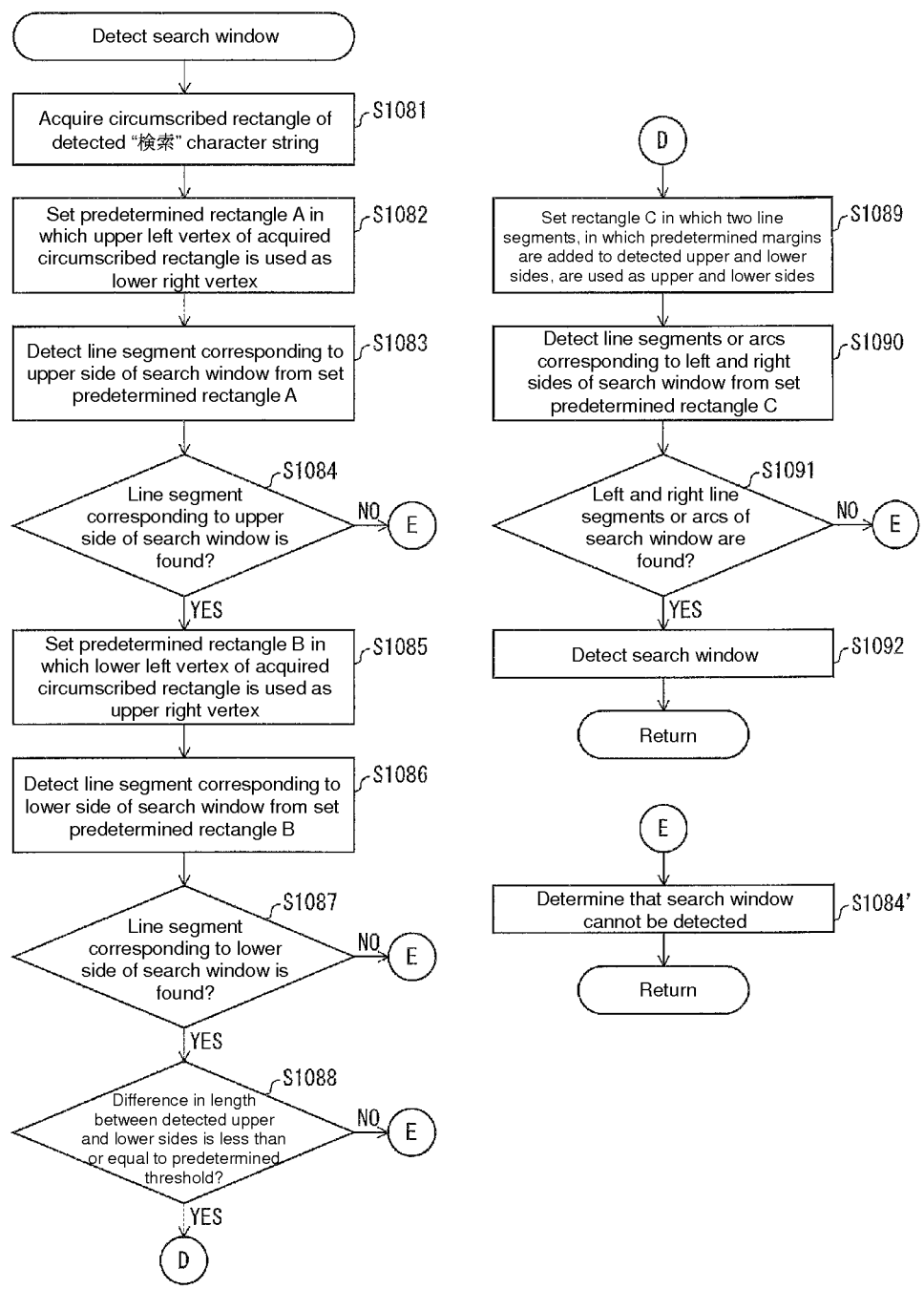
FIG. 3 is a flowchart illustrating a procedure of search window detection processing performed by a search window detector of the reproduction device.

FIG. 3 is a flowchart illustrating a procedure of the search window detection processing in which the search window detector 115 of the first embodiment detects the search window SB. FIGS. 4(a) and 4(b) are views illustrating examples of the search window, FIG. 4(a) illustrates the example in which the search window is located near the left side of the "検索" character string, and FIG. 4(b) illustrates the example in which the search window is located near an upper side of the "検索" character string.

As illustrated in FIGS. 3 and 4(a), a circumscribed rectangle BB of the "検索" character string SC detected by the character string detector 113 is acquired (S1081), an upper left vertex of the acquired circumscribed rectangle BB is used as a lower right vertex to set a horizontally-long rectangle A having predetermined dimensions (S1082).

The line segment (first line segment) corresponding to the upper side of the search window SB is detected from the set rectangle A (S1083). Specifically, in the set rectangle A, the line segment extending in the horizontal direction (direction parallel to the upper side of the circumscribed rectangle BB) is detected as the first line segment.

In the case that a plurality of line segments are detected in the rectangle A, preferably the line segment closest to the lower side of the rectangle A is selected as the first line segment. This is because, in the case that the line segment closest to the lower side of the rectangle A is not selected, the line segment remains in the search window SB to generate a risk of false recognition due to the remaining line segment during the character recognition in the search window SB.

When the first line segment cannot be detected (NO in S1084), a determination that the search window SB cannot be detected is made (S1084'), the search window detection processing is ended, and the procedure returns to the original processing in FIG. 2.

On the other hand, when the first line segment can be detected (YES in S1084), a lower left vertex of the circumscribed rectangle BB is used as an upper right vertex to set a horizontally-long rectangle B having predetermined dimensions similar to the rectangle A (S1085). The line segment (second line segment) corresponding to the lower side of the search window SB is detected from the set rectangle B (S1086). Specifically, in the set rectangle B, the line segment extending in the horizontal direction (direction parallel to the lower side of the circumscribed rectangle BB) is detected as the second line segment.

In the case that a plurality of line segments are detected in the rectangle B, preferably the line segment closest to the upper side of the rectangle B is selected as the second line segment. This is because, in the case that the line segment closest to the upper side of the rectangle B is not selected, the line segment remains in the search window SB to generate the risk of the false recognition due to the remaining line segment during the character recognition in the search window SB.

When the second line segment cannot be detected (NO in S1087), a determination that the search window SB cannot be detected is made (S1084'), the search window detection processing is ended, and the procedure returns to the original processing in FIG. 2. On the other hand, when the second line segment can be detected (YES in S1087), the procedure goes to Step S1088.

It is deemed that the upper and lower sides of the search window SB are substantially equal to each other in length. Accordingly, in the case that the first and second line segments detected in Steps S1083 and S1086 differ significantly from each other in length, the first and second line segments will be deemed to be not the upper and lower sides of the search window SB.

Therefore, whether a difference in length between the first and second line segments is greater than or equal to a predetermined threshold is determined in Step S1088. When the difference in length is greater than the predetermined threshold (NO in S1088), a determination that the search window SB cannot be detected is made (S1084'), the search window detection processing is ended, and the procedure returns to the original processing in FIG. 2.

Figure 4:
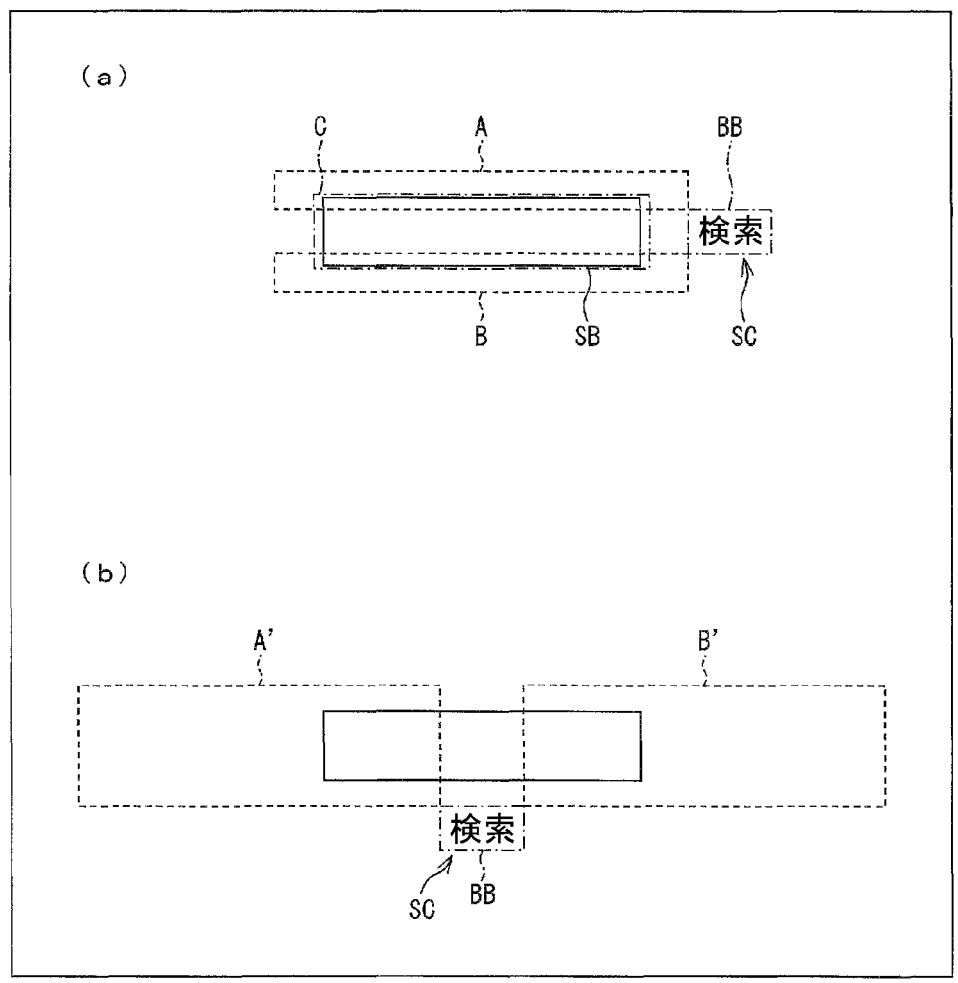
FIGS. 4(a) and 4(b) are views illustrating examples of a search window.

On the other hand, when the difference in length is less than or equal to the predetermined threshold (YES in S1088), both ends of each of the first and second line segments are extended by a predetermined length (margin) to set a rectangle C in which the two extended line segments are used as the upper and lower sides (S1089). For the sake of easy understanding, the upper and lower sides of the rectangle C are illustrated in FIG. 4(*a*) as shifted from the upper and lower sides of the search window SB.

Two lines (line segments or arcs) corresponding to a left side (left line) and a right side (right line) of the search window SB are detected from the set rectangle C (S1090). Specifically, in the set rectangle C, two lines coupling the first and second line segments to each other are detected as the two lines corresponding to the left and right lines.

The two lines may be the line segments or the arcs. A range where the two lines corresponding to the left and right lines of the search window SB is not necessarily set to the whole of the rectangle C. For example, the line corresponding to the left line may be detected in one third of the range on the left side of the rectangle C while the line corresponding to the right line may be detected in one third of the range on the right side of the rectangle C. In this case, the time necessary for the processing to detect the search window SB is shortened because of the narrow detection range.

When the two lines corresponding to the left and right lines of the search window SB are not detected (NO in S1091), a determination that the search window SB cannot be detected is made (S1084'), the search window detection processing is ended, and the procedure returns to the original processing in FIG. 2. On the other hand, when the two lines are detected (YES in S1091), a determination that the search window SB can be detected is made (S1092), the search window detection processing is ended, and the procedure returns to the original processing in FIG. 2.

Accordingly, the region where the search window SB is detected is restricted to the rectangle A (upper portion detecting rectangle), the rectangle B (lower portion detecting rectangle), and the rectangle C (side portion detecting rectangle). Accordingly, the search window SB can be more rapidly detected, and therefore the search key word can be more rapidly detected.

Either the processing to detect the upper side of the search window SB (S1082 to S1084) or the processing to detect the lower side of the search window SB (S1085 to S1087) may be performed first.

In the first embodiment, the character string detector 113 detects the feature point of each character present in the "検索" character string from the still image. Alternatively, for example, one feature point (for example, "索") of each character may be detected, and another feature point (for example, "検") of each character may be detected from the surroundings of the detected feature point. Alternatively, the character string detector 113 may simultaneously detect the feature points of the plurality of characters (that is, "検索") present in the "検索" character string from the still image.

[Modification]

In the first embodiment, assuming that the search window SB is located near the left side of the "検索" character string SC, the search window SB is detected near the left side of the "検索" character string SC. Alternatively, the search window SB may be located near any one of the upper, lower, right, and left sides of the "検索" character string SC (character string prompting the user to perform the search).

Even if the search window SB is located near any one of the upper, lower, right, and left sides of the "検索" character string SC, the search window SB can be detected as follows. Firstly, a detection priority order (for example, in the order of the left, upper, right, and lower sides) is previously set with respect to the upper, lower, right, and left directions of the "検索" character string SC. The Search window SB is detected in the set priority order. When the search window SB can be detected in a certain direction, the detection of the search window SB is ended at that time.

The procedure to detect the search window SB in the neighborhood on the left side of the "検索" character string SC is described above. As to a procedure to detect the search window SB in the neighborhood on the right side of the "検索" character string SC, the "left" and the "right" may be replaced with each other in the procedure to detect the search window SB in the neighborhood on the left side of the "検索" character string SC.

An example of the procedure to detect the search window SB in the neighborhood on the upper side of the "検索" character string SC will be described with reference to FIG. 4(b).

Firstly, the circumscribed rectangle BB of "検索" character string SC is acquired, the upper left vertex of the acquired circumscribed rectangle BB is used as the lower right vertex to set a horizontally-long rectangle A' having predetermined dimensions, and the upper right vertex of the circumscribed rectangle BB is used as the lower left vertex to set a horizontally-long rectangle B' having predetermined dimensions similar to those of the rectangle A'. Then, in the rectangle A', a reversely-U-shaped line in which the upper and lower sides reach the right end of the rectangle A' is detected as the first line, and in the rectangle B', a U-shaped line in which the upper and lower sides reach the left end of the rectangle B' is detected as the second line.

A third line coupling the upper sides of the first and second lines to each other is detected, and a fourth line coupling the lower sides of the first and second lines to each other is detected, thereby detecting the search window SB surrounded by the first to fourth lines. Alternatively, the rectangle A including the upper sides of the first and second lines is set, the rectangle B including the lower sides of the first and second lines is set, and the search window SB may be detected by performing a procedure similar to the procedure in FIG. 4(a). As to a procedure to detect the search window SB in the neighborhood on the lower side of the "検索" character string SC, the "upper" and the "lower" may be replaced with each other in the procedure to detect the search window SB in the neighborhood on the upper side of the "検索" character string SC.

[Second Embodiment]

A second embodiment of the invention will be described with reference to FIGS. 5 to 8. For the sake of convenience, the configuration having the same function as the configuration of the first embodiment is designated by the same numeral, and the description is neglected.

[Configuration of Display Device]

Figure 5:
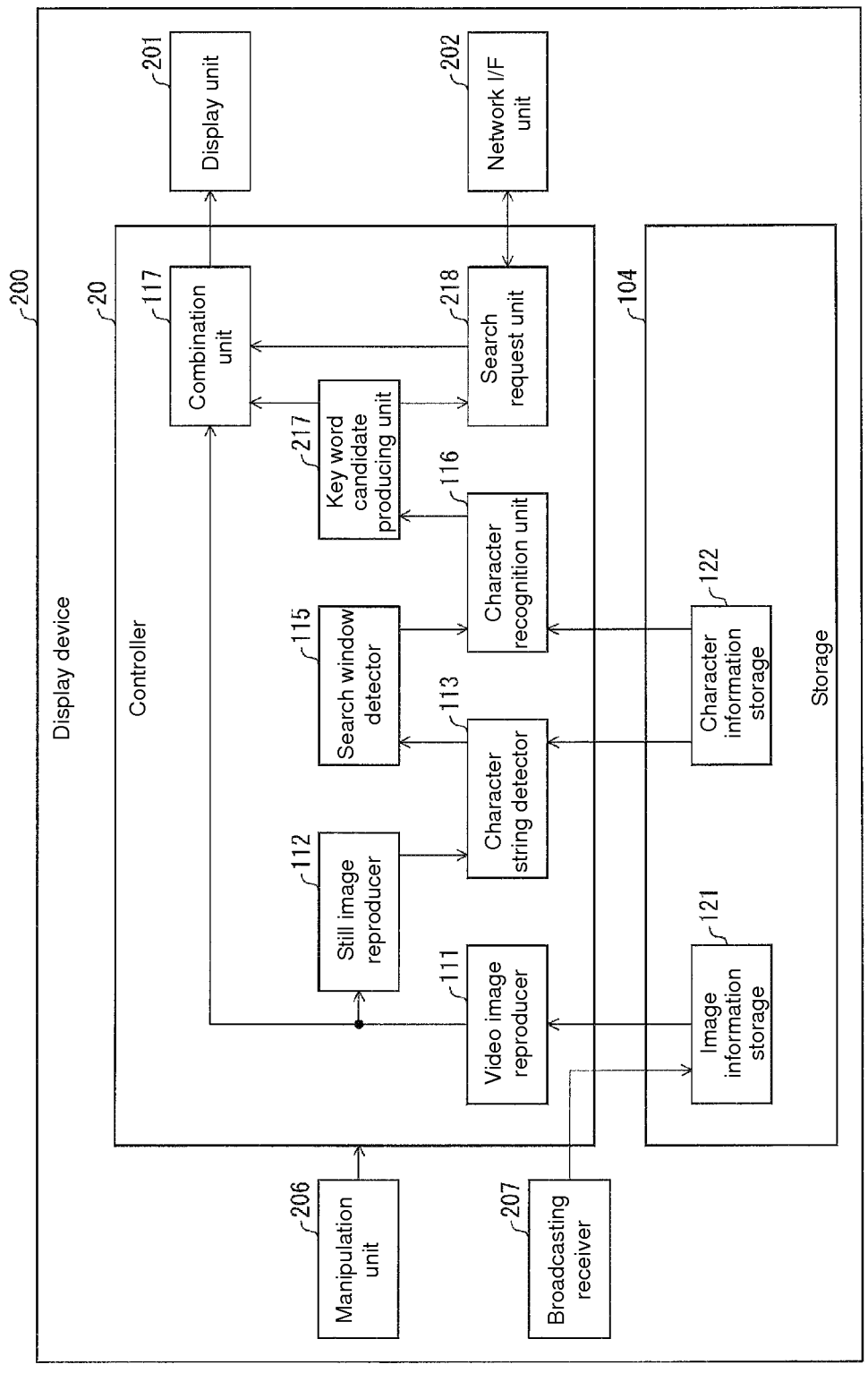
FIG. 5 is a block diagram illustrating a schematic configuration of a display device according to a second embodiment of the invention.

FIG. 5 is a block diagram illustrating a schematic configuration of display device 200 (display apparatus) according to a second embodiment of the invention. A Display device 200 of the second embodiment is what is called an internet television receiver in which an internet connection function is added to the TV receiver.

As illustrated in FIG. 5, compared with the reproduction device 110 in FIG. 1, the display device 200 has the configuration in which a network I/F (interface) unit 202, a manipulation unit 206, and a broadcasting receiver 207 are added when a display unit 201 is provided instead of the transmitter 101. Compared with the controller 10 of the reproduction device 110 in FIG. 1, a controller 20 of the display device 200 has the configuration in which a key word candidate producing unit 217 and a search request unit 218 are added.

The Display unit 201 displays various pieces of information such as the character and the image based on the image data from the controller 20. The Display unit 201 is constructed with a display device such as an LCD (liquid crystal display device), a CRT (cathode ray tube), and a plasma display.

The Network I/F unit 202 interfaces between the controller 20 and an external communication network (not illustrated). Specifically, the network I/F unit 202 is connected to the communication network, converts the data from the controller 20 into the data having the form suitable for the communication network, and transmits the converted data to the communication network. The Network I/F unit 202 also converts the data from the communication network into the data having the form suitable for the processing in the controller 20, and transmits the converted data to the controller 20.

The Manipulation unit 206 receives various inputs from the user by user's manipulation, and is constructed with an input button, a touch panel, and other manipulation devices. The Manipulation unit 206 converts the information manipulated by the user into manipulation data, and transmits the manipulation data to the controller 20. Examples of other manipulation devices include a keyboard, a numerical keypad, and a pointing device such as a mouse.

The Broadcasting receiver 207 receives a TV broadcasting wave from an external broadcasting station through an antenna (not illustrated). The Broadcasting receiver 207 extracts AV (Audio Visual) data from the received TV broadcasting wave, and stores the extracted AV data in image information storage 121 through the controller 20.

The Key word candidate producing unit 217 is provided between a character recognition unit 116 and a combination unit 117, and produces the search key word candidate based on the one or plurality of recognized character string recognized by the character recognition unit 116. The Key word candidate producing unit 217 transmits the produced search key word candidate to the combination unit 117 and the search request unit 218. Therefore, the search key word candidate is combined with the video image by the combination unit 117, and displayed on the display unit 201. The Key word candidate producing unit 217 is described in detail later.

The Search request unit 218 makes a request to perform the search using the search key word acquired through the manipulation unit 206 by the user to the network search engine on the internet through the I/F unit 202. Specifically, the search request unit 218 sets the search key word selected through the manipulation unit 206 by the user in the search key word candidates from key word candidate producing unit 217. The Search request unit 218 makes the request to perform the search using the search key word to the search engine through the network I/F unit 202. The Search request unit 218 acquires a result of the search from the search engine through the network I/F unit 202. The acquired result of the search is displayed through the combination unit 117 and the display unit 201.

[Detailed Production of Search Key Word]

The Key word candidate producing unit 217 will be described in detail below. In the second embodiment, the key word candidate producing unit 217 provides a candidate order to the plurality of recognized character strings, and produces the recognized character strings having the top candidate order to the predetermined candidate order as the search key word candidates. With regard to the candidate order, a statistical amount (for example, average value) of degrees of matching reliability of the character constituting the recognized character string is arranged in the descending order. As used herein, the degree of matching reliability of the character means a degree of matching between the feature of the character in a search window SB and the feature of the character stored in a character information storage 122 with respect to the recognized character.

Figure 6:
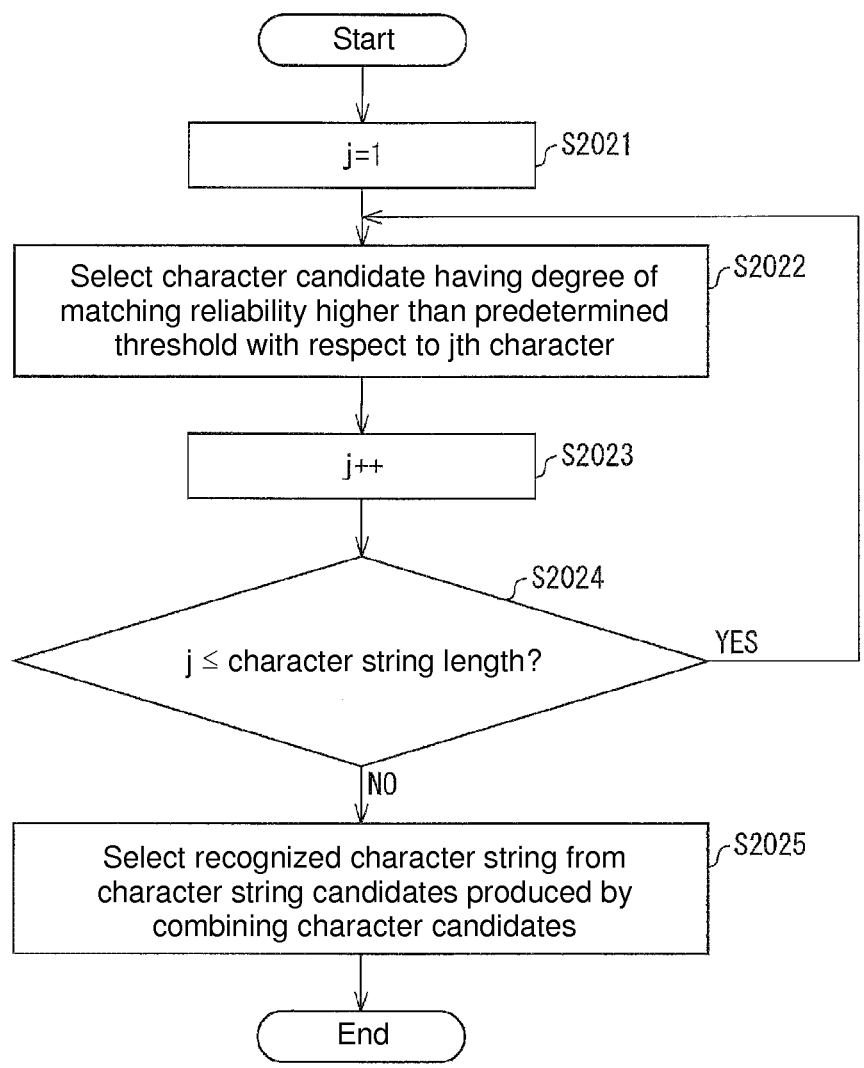
FIG. 6 is a flowchart illustrating a procedure of processing performed by a search key word producing unit of the display device.

FIG. 6 is a flowchart illustrating a procedure of the key word candidate producing processing performed by the key word candidate producing unit 217. The key word candidate producing processing is performed in Step S113 of FIG. 2.

As illustrated in FIG. 6, an initialization is performed to set j to 1 (S2021), and the character candidate in which the degree of matching reliability is higher than a predetermined threshold is selected with respect to a jth character in the character string recognized by the character recognition unit 116 (S2022).

From the viewpoint of reducing processing burden, desirably the maximum number of character candidates is restricted to a predetermined number (for example, three). In the case the character candidates differ largely from each other in the degree of matching reliability, there is a high possibility that the character candidate having the higher degree of matching reliability is correctly recognized and the character candidate having the lower degree of matching reliability is wrongly recognized. Accordingly, desirably the character candidate is restricted to the character candidate in which the difference with the highest degree of matching reliability falls within a predetermined range.

The processing in Step S2022 is repeated with respect to all the characters in the recognized character string (S2023 and S2024). Then the character string candidate is produced by combining character candidates of the characters in the recognized character string (S2025). Accordingly, (the number of character string candidates)=(the number of character candidates of first character)×(the number of character candidates of second character)× . . . ×(the number of character candidates of the final character) is obtained.

An average value (score) of the degrees of matching reliability is calculated with respect to each of the produced character string candidates, and the character string candidate having the higher calculated average value is selected as the recognized character string (S2025). The selected recognized character string is transmitted as the search key word candidate to the combination unit 117 and the search request unit 218.

From the viewpoint of reducing processing burden, desirably the maximum number of recognized character strings is restricted to a predetermined number (for example, three). In the case the character string candidates differ largely from each other in the average value of the degrees of matching reliability, there is a high possibility that the character string candidate having the higher average value of the degrees of matching reliability is correctly recognized and the character string candidate having the lower average value of the degrees of matching reliability is wrongly recognized. Accordingly, desirably the character string candidate is restricted to the character string candidate in which the difference with the highest average value of the degrees of matching reliability falls within a predetermined range.

Figure 7:
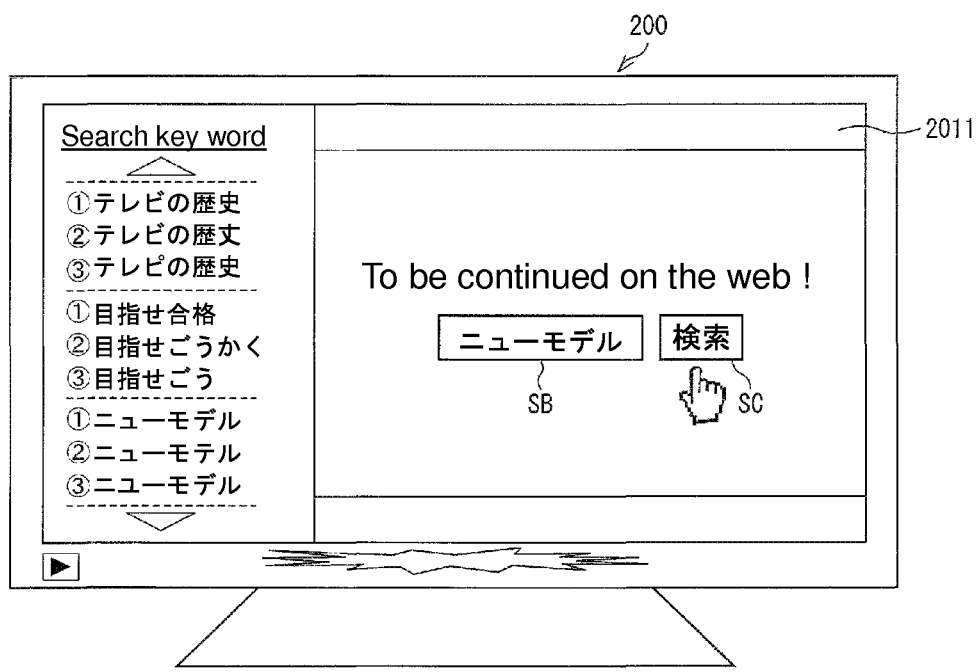
FIG. 7 is a front view of the display device, and a view illustrating a display example of a display unit in the display device.

FIG. 7 is a front view of the display device 200, and illustrates an example in which the search key word candidates are displayed on a display screen 2011 of the display unit 201. As illustrated in FIG. 7, the video image is displayed from the right portion to central portion of the display screen 2011. The video image includes a "検索" character string SC and a search window SB located near the left side of the "検索" character string SC, and the search window SB includes a character string "new model".

On the other hand, the search key word candidates are displayed in the left portion of the display screen 2011 together with past histories. Specifically, "ニューモデル", "ニューモテル", and "ニューモデノ" illustrated in the lower left of the display screen 2011 are the search key word candidates produced from the character string "ニューモデル" in a present search window SB. "目指せ合格", "目指せごうかく", and "目指せごう" illustrated in the left center of the display screen 2011 are the search key word candidates produced from the character string in a previously-displayed search window SB. "テレビ の歴史", "テレビの歴丈", and "テレビの歴ま" illustrated in the upper left of the display screen 2011 are the search key word candidates produced from a character string in a search window SB displayed before the previously-displayed search window SB.

The number starting from 1 is provided to each search key word candidate in the descending order of the score. Desirably an initial position of a pointer, which is used by the user in order to select the search key word during the search on the internet, is set to a position of the search key word candidate having the number 1 on display screen 2011. In this case, time necessary for the user to select the correct search key word can be shortened, because a possibility of correctly recognizing the character string in the search window SB is enhanced with increasing score of the search key word candidate. The number of search key word candidates may be increased. In this case, a possibility that the proper search key word is present in the search key word candidate is further enhanced.

In the case that the instances of processing in Steps S108, S109, and S115 to S119 of FIG. 2 are repeated, similar search window SB is present in the produced plurality of still images. In this case, the recognized character string is selected in each still image, and a different recognized character string having the higher score may be selected as the search key word candidate in the selected recognized character strings. In the case that the same recognized character strings are selected in the plurality of still images, the scores of the recognized character strings of still images may be integrated to use the integrated score or the average value of the scores as the score of the recognized character strings.

In the video image including the search window SB, sometimes the character string does not appear at one instance in the search window SB but the character string appears gradually as if the user inputs the characters. In this case, it is deemed that a recognized character string having a larger number of characters selected from a later still image in the plurality of still images is more appropriate for the search key word candidate rather than a recognized character string having a smaller number of characters selected from an earlier still image.

Therefore, desirably the score is weighted such that the score of the recognized character string selected from the later still image is higher than that of the recognized character string selected from the earlier still image. Specifically, in the case that the numbers of characters of the recognized character strings selected from two continuous still images differ from each other, the weight of the score of the recognized character string selected from the later still image is increased. Therefore, the appropriate search key word candidate can be displayed.

Figure 8:
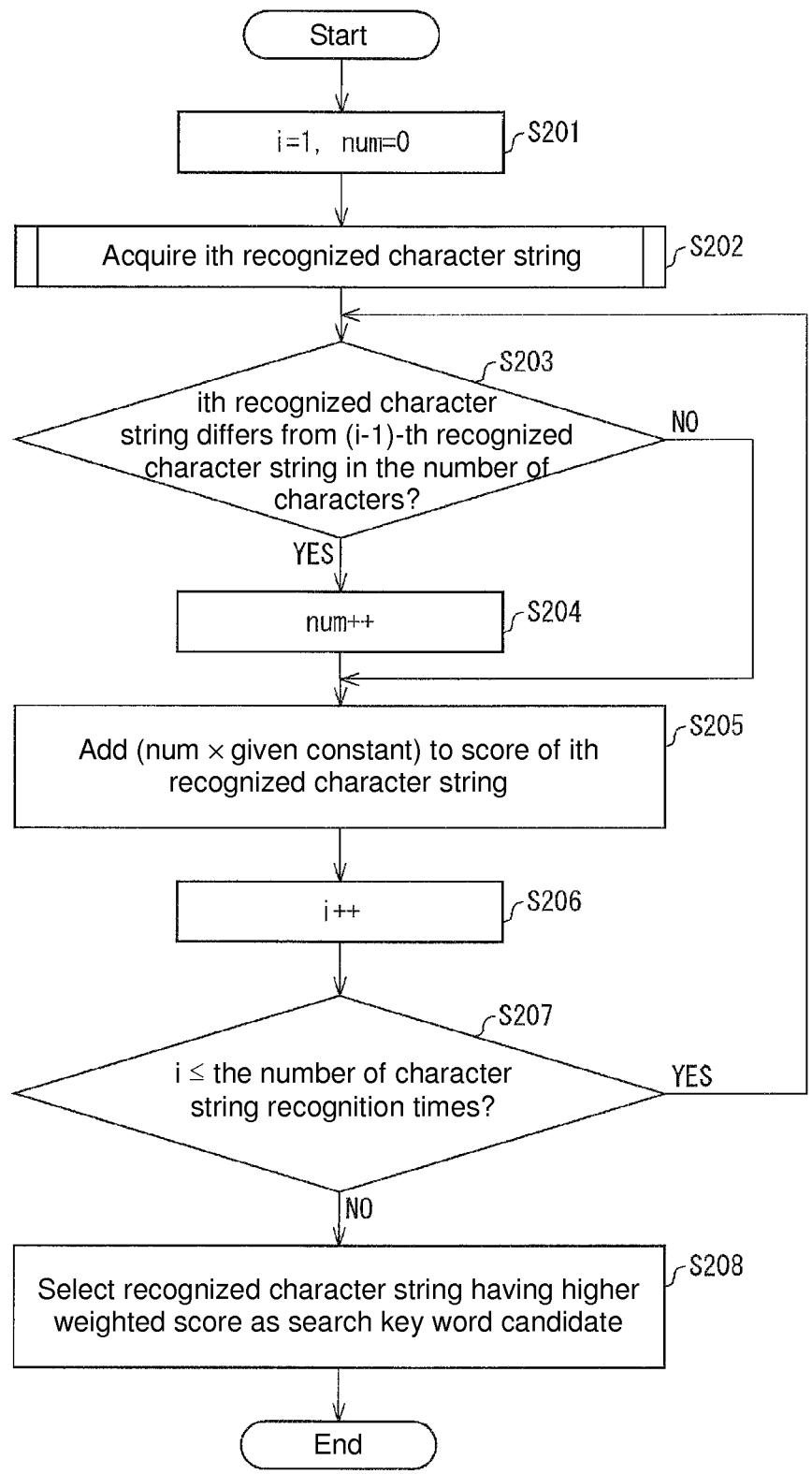
FIG. 8 is a flowchart illustrating a procedure of another piece of processing performed by the search key word producing unit.
Figure 9:
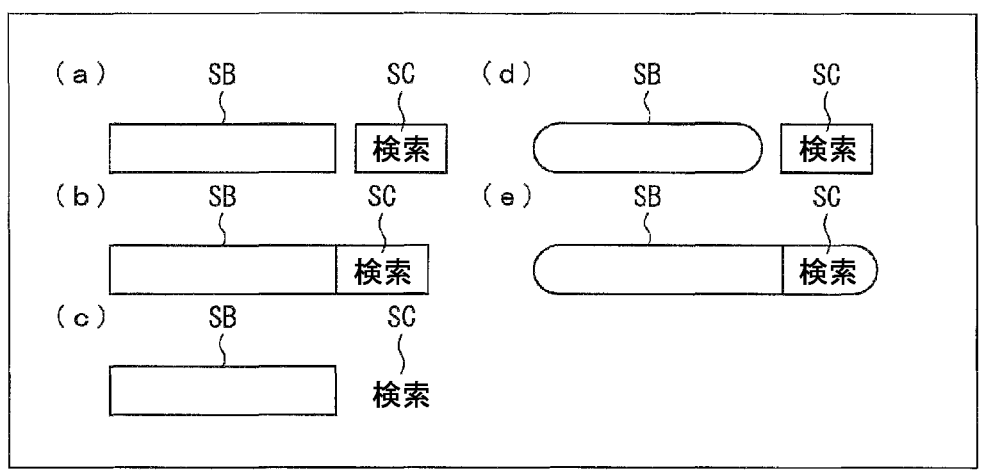
FIGS. 9(a) to 9(e) are views illustrating various forms of search windows and "検索" character strings.

FIG. 8 is a flowchart illustrating a procedure of the key word candidate producing processing in which the weighting is considered. As illustrated in FIG. 8, an initialization is performed to set i to 1 and to set num to 0 (S201). The processing in FIG. 6 is performed to the ith still image, and the selected recognized character string and the score thereof are acquired (S202).

Whether the number of characters of the acquired recognized character string differs from the number of characters of the recognized character string selected from the (i−1)-th (previous) still image is determined (S203). When the number of characters of the acquired recognized character string differs from the number of characters of the recognized character string selected from the (i−1)-th still image, num is incremented (S204). That is, num expresses the number of times at which the number of characters of the recognized character string changes. For i=1, the number of characters of the recognized character string selected from the 0th still image may be set to 0, or Steps S203 and S204 may be skipped.

A product of num and a given constant is added to the score of the recognized character string selected from the ith still image (S205). That is, the weight added to the score increases every time the number of characters changes.

Then Steps S203 to S205 are repeated in time series order with respect to all the still images (S206 and S207). In the recognized character strings selected from the still images, a recognized character string having the higher weighted score is selected as the search key word candidate (S208). The selected search key word candidate is transmitted to the combination unit 117 and the search request unit 218. From the viewpoint of reducing processing burden, desirably the maximum number of search key word candidates is restricted to a predetermined number (for example, three).

Referring to the display example in FIG. 7, the search key word candidates illustrated in the left center in the display screen 2011 is selected in the case that the character strings are displayed in the search window SB in the order of "目指せごう", "目指せごうかく", and "目指せ合格". In this case, because the later the recognized character string is displayed, the more the weighting increases and the smaller the number provided to the recognized character string as the search key word candidate becomes, so that the search key word candidate having the smaller number is displayed in the upper portion.

The invention is not limited to the above embodiments, but various changes can be made without departing from the scope of the invention. The embodiment obtained by a proper combination of technical means disclosed in the different embodiments is also included in the technical scope of the invention.

For example, in the embodiments, the search window SB is detected from the position of the detected "検索" character string SC to select the search key word candidate in the search window SB. Alternatively, the search key word candidate may directly be selected from the surroundings of the detected "検索" character string SC. In this case, there is a risk of widening the character string detection region of the character string or a risk of wrongly recognizing the external character string from the search window SB. However, the processing of detecting the search window SB can be eliminated.

In the embodiments, the internet television receiver is particularly described. However, the invention can be applied to mobile devices, such as a mobile phone and a portable game machine, in which the TV broadcasting can be viewed when internet communication is conducted.

Each unit of the reproduction device 110 of an embodiment of the invention may be constructed with hardware logic or implemented by software using a CPU (Central Processing Unit).

That is, the reproduction device 110 includes the CPU that executes a command of a control program implementing each function, a ROM in which the control program is stored, a RAM on which the control program is expanded, and a storage (recording medium), such as a memory, in which the control program and various pieces of data are stored.

The recording medium in which a program code (executable format program, intermediate code program, and source program) of the control program that is of the software implementing each function is recorded in a computer-readable manner is supplied to the reproduction device 110, and a computer (or CPU or MPU) reads and executes the program code recorded in the recording medium, which allows the object of the invention to be also achieved.

Examples of the recording medium include tape systems such as a magnetic tape and a cassette tape, disk systems including magnetic disks such as a floppy (registered trademark) disk and a hard disk and optical disks such as a CD-ROM, an MO, an MD, a DVD, and a CD-R, card system such as an IC card (including a memory card) and an optical card, and semiconductor memory systems such as a mask ROM, an EPROM, an EEPROM (registered trademark), and a flash ROM.

The Reproduction device 110 is configured to be able to be connected to a communication network, and the program code may be supplied through the communication network. There is no particular limitation to the communication network. For example, the internet, an intra-net, an extra-net, a LAN, an ISDN, a VAN, a CATV communication network, a virtual private network, a telephone line network, a mobile communication network, and a satellite communication network can be used as the communication network. There is no particular limitation to a transmission medium constituting the communication network. For example, both a wired transmission medium such as IEEE1394, a USB, a power-line carrier, a cable TV line, a telephone line, and an ADSL line and a wireless transmission medium such as an infrared ray including IrDA and a remote controller, Bluetooth (registered trademark), 802.11 wireless, HDR, a mobile phone network, a satellite line, and a digital terrestrial broadcasting network can be used as the transmission medium.

A key word detection device of an embodiment of the invention is configured to detect a search key word from a target image in order to perform a search with a search engine on the internet. In order to solve the above problem, the key word detection device includes: a feature point detector configured to detect a feature point of a specific character string from the target image, the specific character string prompting a user to perform the search; and a key word recognition unit configured to recognize a character string existing in surroundings of the feature point detected by the feature point detector as the search key word in the target image.

Preferably the key word detection device of the invention further includes a search window detector configured to detect a search window from the surroundings of the feature point detected by the feature point detector in the target image, the search window being used to input the search key word. In the key word detection device, preferably the key word recognition unit is configured to recognize a character string in the search window detected by the search window detector as the search key word.

Generally, because the shape of the search window is restricted to the rectangle or the like, the search window can significantly rapidly be detected in the surroundings of the feature point compared with the case that the character string is detected by the character recognition. Because the inside of the search window is much narrower than the surroundings of the feature point, the character string can significantly rapidly be detected from the inside of the search window compared with the case that the character string is detected from the surroundings of the feature point. Accordingly, in the above case, the search key word can more rapidly be detected.

In many cases the search window is located near the left side of the specific character string, such as "検索", which prompts the user to perform the search. Although the search window has various shapes based on the rectangle, generally the upper side is located in the upper left above an upper left vertex coordinate of a circumscribed rectangle (bounding box) of the specific character string, and the lower side is located in the lower left below a lower left vertex coordinate of the circumscribed rectangle. As used herein, the circumscribed rectangle means a minimum rectangle having contact with the target.

Therefore, in the key word detection device of the invention, preferably the search window detector is configured to, in the target image, obtain a circumscribed rectangle of the specific character string, set an upper portion detecting rectangle in which an upper left vertex of the obtained circumscribed rectangle is used as a lower right vertex and a lower portion detecting rectangle in which a lower left vertex of the circumscribed rectangle is used as an upper right vertex, detect an upper side and a lower side of the search window in the set upper portion detecting rectangle and lower portion detecting rectangle, set a side portion detecting rectangle in which a rectangle constructed with the detected upper and lower sides is widened in directions of both sides, and detect the search window by detecting lines on right and left sides of the search window in the set side portion detecting rectangle.

In this case, the region where the search window is detected is restricted to the regions of the upper portion detecting rectangle, the lower portion detecting rectangle, and the side portion detecting rectangle. Accordingly, the search window can be more rapidly detected, and therefore the search key word can be more rapidly detected.

In the key word detection device of an embodiment of the invention, preferably the target image is a series of still images in a video image, and in a case where the search window detector detects the search window from a certain one of the still images, operation of the feature point detector is eliminated until the search window is not detected from a subsequent one of the still images.

In this case, the detection of the feature point of the specific character string with the feature point detector is eliminated when the search window is detected, so that the search key word can be more rapidly detected. In addition, because the feature point of the specific character string is detected by checking the whole of the target image, the time necessary for the detection is lengthened with increasing size of the target image. Accordingly, in the above case, the delay of the detection of the search key word due to the increased size of the target image can be constrained.

The character obtained by the character recognition includes some character candidates in the order of the degree of matching reliability. Although the first character candidate is not always the correct character, there is a high possibility that one of the high-order (for example, first to third) character candidates is the correct character.

Therefore, in the key word detection device of an embodiment of the invention, preferably the key word recognition unit is configured to recognize the character to detect one or a plurality of character candidates satisfying a predetermined condition in each character constituting the character string in the search window, and the key word recognition unit is configured to produce a plurality of search key word candidates by combining the character candidates of the characters. In this case, a risk that the correct search key word is not obtained by combining only the first character candidates can be reduced.

It is considered that, even in the second character candidate or later, the correct character has the high degree of matching reliability or the difference in the degree of matching reliability compared with the first character candidate is small.

Therefore, in the key word detection device of an embodiment of the invention, preferably, in the predetermined condition, a degree of matching reliability of the character recognition is greater than a predetermined threshold. Preferably, in the predetermined condition, a difference between a degree of matching reliability of the character recognition and a degree of matching reliability of a character candidate (first character candidate) having a maximum degree of matching reliability falls within a predetermined range. In these cases, the character candidate including the correct character can properly be detected.

In the key word detection device of an embodiment of the invention, preferably the key word recognition unit is configured to set a score of a recognized character string in which the character candidates of the characters are combined to an average value of the degrees of matching reliability of the character candidates constituting the recognized character string, and set the recognized character string having a higher score to the search key word candidate. In this case, the candidate including the correct search key word can properly be detected.

Sometimes the character string and the number of characters in the search window change with time. In this case, there is a high possibility that the character string recognized after the changes of the character string and the number of characters is the correct search key word.

Therefore, in the key word detection device of an embodiment of the invention, preferably the target image is a series of still images in a video image, the key word recognition unit is configured to produce the search key word candidate from the produced recognized character string after the search window detector detects the search window from a certain one of the still images until the search window is not detected from a subsequent one of the still images, weighting of the score of the recognized character string increases every time the number of characters of the recognized character string from the subsequent still image changes compared to the number of characters of the recognized character string from the certain still image, and the recognized character string having a higher weighted score is set to the search key word candidate. In this case, the key word detection device of an example embodiment of the present invention can deal with the case that the character string and the number of characters in the search window change with time.

As described above, in the key word detection device of an example embodiment of the present invention, the feature point of the specific character string prompting the user to perform the search is detected in the target image, the character string existing in the surroundings of the detected feature point is recognized as the search key word, which allows the search key word to be rapidly detected than ever before. Therefore, the key word detection device of an embodiment of the present invention can be applied to any device that detects the search key word from the target image.

A key word detection device of an embodiment of the invention is configured to detect a search key word from a target image in order to perform a search with a search engine on the internet. In order to solve an above-mentioned problem of prior art, the key word detection device includes: a feature point detector configured to detect a feature point of a specific character string from the target image, the specific character string prompting a user to perform the search; and a key word recognition unit configured to recognize a character string existing in surroundings of the feature point detected by the feature point detector as the search key word in the target image.

A method of an embodiment of the invention for controlling a key word detection device is configured to detect a search key word from a target image, the search key word being used to perform a search with a search engine on the internet. In order to solve an above-mentioned problem of prior art, the key word detection device controlling method includes: a feature point detection step of detecting a feature point of a specific character string from the target image, the specific character string prompting a user to perform the search; and a key word recognition step of recognizing a character string existing in surroundings of the feature point detected in the feature point detection step as the search key word in the target image.

According to the above configuration and method, the feature point of the specific character string prompting the user to perform the search is detected in the target image, and the character string existing in the surroundings of the detected feature point is recognized as the search key word.

Conventionally, like in Patent Document 1, sometimes the specific character string is extracted after the character recognition is performed to the entire target image. In this case, it is necessary to perform a first processing to match the feature point of the character against the feature point of the target image and a second processing to determine whether the specific character string is present in the character string detected by the matching of the first processing with respect to each of many characters.

On the other hand, in an embodiment of the invention, it is only necessary to perform processing to match the feature point of the specific character string against the feature point of the target image with respect to each of some specific character strings. That is, in the invention, compared with the conventional case, the feature point of the character is matched against the feature point of the target image with respect to each of a few characters in the first processing, and the second processing is eliminated. Accordingly, the number of instances of processing is decreased, and the number of repeated times of the matching is also decreased, so that the character string can rapidly be detected than ever before.

In the conventional case where a rectangular frame of the search window is detected from the target image, because the small number of feature points exists in a geometric configuration such as the rectangle, many geometric configurations are probably detected from the target image. Therefore, it is necessary to specify the rectangular frame of the search window from the many geometric configurations detected. On the other hand, in the embodiment of the invention in which the feature character string is detected from the target image, because the specific character string has many feature points, there is a low possibility of detecting many character strings from the target image. Therefore, there is a high possibility that the search key word can be rapidly detected than ever before.

The region where the character string is recognized as the search key word is restricted to the surroundings of the detected feature point, so that the character string can be rapidly detected. Therefore, the search key word can be rapidly detected than ever before.

"検索", "サーチ (search), "確認", "チェック (check)", and translated words thereof can be cited as an example of the specific character string prompting the user to perform the search. The feature point of the specific character string may be detected in each character present in the specific character string or in each set of a plurality of characters. In the case that the feature point is detected in each character, the feature point of a certain character present in the specific character string is detected, and the feature point of another character present in the specific character string may be detected from the surroundings of the detected feature point.

The same advantageous effect as described above can be obtained with any display apparatus including the key word detection device having the above configuration and a display device, the key word detection device configured to detect the search key word used to perform the search with the search engine on the internet, the display device configured to display the search key word detected by the key word detection device and the target image.

Each unit of the key word detection device can be implemented on a computer by a control program. Additionally, the control program is stored in a computer-readable recording medium, which allows the key word detection device to be implemented on any computer.

As described above, in the key word detection device of the invention, the feature point of the specific character string prompting the user to perform the search is detected in the target image, and the character string existing in the surroundings of the detected feature point is recognized as the search key word. The feature point of the specific character string can be rapidly detected, the character string can be rapidly detected, and therefore advantageously the search key word can be rapidly detected than ever before.

The invention claimed is:

1. A key word detection device for detecting a search key word from a target image in order to perform a search with a search engine on the internet, the key word detection device comprising:
   a processor configured to operate as:
      a feature point detector configured to detect a feature point of a specific character string from the target image, the specific character string prompting a user to perform the search;
      a key word recognition unit configured to recognize a character string existing in surroundings of the feature point detected by the feature point detector as the search key word in the target image;
      a storage for storing character information and data of the target image used by the processor; and
      a search window detector configured to detect a search window from the surroundings of the feature point detected by the feature point detector in the target image, the search window being used to input the search key word;
      wherein the key word recognition unit is configured to recognize a character string in the search window detected by the search window detector as the search key word, and the search window detector is configured to, in the target image, detect presence of the search window in a neighborhood of the recognized character string according to a detection priority order set based on specific detection directions from the character string.

2. The key word detection device according to claim 1, wherein the search window detector is configured to, in the target image, obtain a circumscribed rectangle of the specific character string;

set an upper portion detecting rectangle in which an upper left vertex of the obtained circumscribed rectangle is used as a lower right vertex of the upper portion detecting rectangle and set a lower portion detecting rectangle in which a lower left vertex of the circumscribed rectangle is used as an upper right vertex of the lower portion detecting rectangle;

detect an upper side and a lower side of the search window in the set upper portion detecting rectangle and the set lower portion detecting rectangle;

set a side portion detecting rectangle in which a rectangle constructed with the detected upper and lower sides of the search window is widened in directions of both sides; and detect the search window by detecting lines on right and left sides of the search window in the set side portion detecting rectangle.

3. The key word detection device according to claim 1, wherein the target image is one of a series of still images in a video image, and in a case where the search window detector detects the search window from a specific one of the still images, operation of the feature point detector is eliminated until the search window is not detected from a subsequent one of the still images.

4. The key word detection device according to claim 1, wherein the key word recognition unit is configured to recognize the character to detect one or a plurality of character candidates satisfying a predetermined condition in each character constituting the character string in the search window; and the key word recognition unit is configured to produce a plurality of search key word candidates by combining the character candidates of the characters.

5. The key word detection device according to claim 4, wherein, in the predetermined condition, a degree of matching reliability of the character recognition is greater than a predetermined threshold.

6. The key word detection device according to claim 4, wherein, in the predetermined condition, a difference between a degree of matching reliability of the character recognition and a degree of matching reliability of a character candidate having a maximum degree of matching reliability falls within a predetermined range.

7. The key word detection device according to claim 4, wherein the key word recognition unit is configured to set a score of a recognized character string in which the character candidates of the characters are combined as an average value of degrees of matching reliability of the character candidates constituting the recognized character string, and set the recognized character string having a higher score compared to other recognized character string as the search key word candidate.

8. The key word detection device according to claim 7, wherein the target image is one of a series of still images in a video image;

the key word recognition unit is configured to produce the search key word candidate from the produced recognized character string after the search window detector detects the search window from a specific one of the still images until the search window is not detected from a subsequent one of the still images;

weighting of the score of the recognized character string increases every time the number of characters of the recognized character string from the subsequent still image changes compared to the number of characters of the recognized character string from the specific still image; and the recognized character string having a higher weighted score is set as the search key word candidate.

9. A display apparatus comprising:

the key word detection device according to claim 1 for detecting the search key word from the target image in order to perform the search with the search engine on the internet; and a display device configured to display the search key word detected by the key word detection device and the target image.

10. A method for controlling a key word detection device configured to detect a search key word from a target image, the search key word being used to perform a search with a search engine on the internet, the key word detection device comprising a processor configured to carry out steps of the method and a storage for storing character information and data of the target image used by the processor, the method comprising:

a feature point detection step of detecting a feature point of a specific character string from the target image, the specific character string prompting a user to perform the search;

a key word recognition step of recognizing a character string existing in surroundings of the feature point detected in the feature point detection step as the search key word in the target image; and a search window detection step of detecting a search window from the surroundings of the feature point detected by the feature point detector in the target image, the search window being used to input the search key word;

wherein the key word recognition step recognizes a character string in the search window detected in the search window detection step as the search key word and the search window detection step detects, in the target image, presence of the search window in a neighborhood of the recognized character string according to a detection priority order set based on specific detection directions from the character string.

11. A non-transitory computer-readable recording medium, having stored thereon computer-readable instructions for executing, by a computer, a method according to claim 10.

* * * * *